March 15, 1966  R. K. BOAK  3,240,407

GUARD, CARRIER AND HOSE RACK

Filed Aug. 4, 1964

INVENTOR
ROBERT K. BOAK

United States Patent Office 3,240,407
Patented Mar. 15, 1966

1

3,240,407
GUARD, CARRIER AND HOSE RACK
Robert K. Boak, New Bloomfield, Pa.
Filed Aug. 4, 1964, Ser. No. 387,291
5 Claims. (Cl. 224—42.38)

This invention relates to a carrier and hose rack for acetylene gas tanks as used by plumbers, electricians and other mechanics and provides a great convenience to the trade to have such a carrier and hose rack, and at the same time affords protection to the valve which, in use, is attached to the tank and to which a hose and burner is secured.

Many mechanics, such as plumbers, electricians, and jewelers, require the use of acetylene burners in their trade. While acetylene is sometimes provided in large tanks which may be used in permanent or semi-permanent locations, smaller portable but still comparatively heavy tanks are provided for use of mechanics to carry to a particular job, or for use where space is limited.

It is customary in handling such small tanks to grasp the top of the tank about the base of the reducing valve with one hand and to grasp the bottom of the tank with the other. To carry the tank the hose is often disconnected, since if it is wound about the tank it can partly unwind and be a nuisance. Carrying the tank up or down stairs, if the end of the hose falls away from the tank, it may trip the person carrying the tank. The reducing valve and the pressure gauge which is screwed to the tank top cannot survive abuse, and objects hitting it may seriously damage one or the other.

It is an objective therefore, of the present invention to provide a carrying means, hose support, and a protector for the valve and pressure gauge on a small tank of acetylene or other highly compressed or liquified gas to convert the tank from a semi-portable object to a truly portable object and to increase the comfort and safety with which such tanks may be used.

In transporting such tanks, in a truck, or the like, it is necessary that the tanks be supported in an upright position for safety reasons. It has been the custom merely to place such tanks in the pickup truck or other vehicle in an upright position and place various tool kits and other objects in position to support it. This creates a hazard, not only that the tanks will tilt to horizontal position when one of the objects holding it up is displaced accidentally, but also that if the tank does fall over, due to the displacement of one of the supporting objects, it may well be that the valve and/or pressure gauge will strike some hard object in the truck and will be damaged.

It is therefore a further object of the present invention to provide a support for a small acetylene tank which may be secured in a desired location and which will securely hold the tank in upright position. It is yet another object of the present invention to provide a support for such a tank, especially for use in small spaces that permit the insertion of the tank into the support without the need to lift the tank to any marked extent in order to insert it in the support.

The provision of a rack to securely hold the hose and burner as the tank is being carried is another important objective of the present invention.

Other and further objects and advantages of the present inventions will appear from the following specification taken with the accompanying drawing in which like characters of reference refer to similar means in the several views and in which:

FIGURE 1 is an elevation of a top of an acetylene tank to which the carrier of the present invention has been attached.

2

Figure 1:
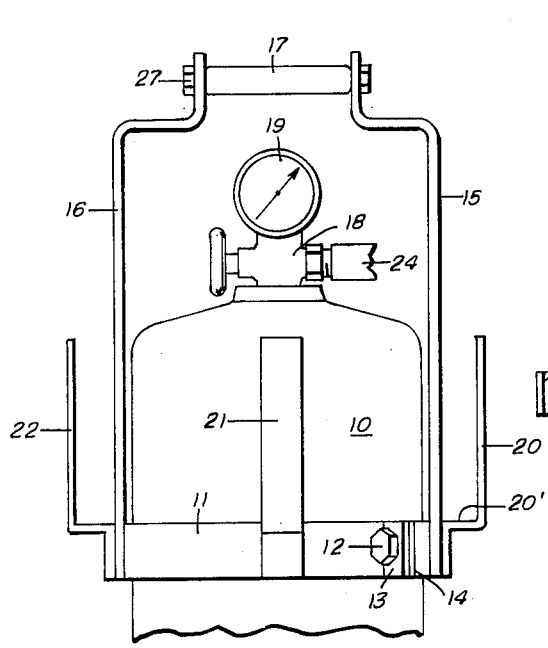
Figure 3:
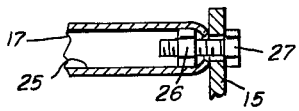
FIGURE 3 is a fragmentary section on line 3—3 of FIGURE 2.

Referring now to FIGURE 1, we see a tank 10 on which the carrier and hose rack of the present invention is attached. The carrier and hose rack comprises a band 11 which may be drawn tightly about the tank 10 by means of a bolt 12 that pulls the outturned ends 13 and 14 of the band 11 together to clamp the band to the tank. To this band 11 are secured vertical bail elements 15 and 16 which extend upwardly, and to the upper ends of which a handle element 17 is secured. It will be noted that the bail elements 15 and 16 extend upwardly beyond the valve 18 and the pressure gauge 19 so that the bail elements 15 and 16, and the handle 17 afford considerable measure of protection to the valve and pressure gauge 18 and 19, respectively.

At least two, preferably four, hook elements 20, 21, 22 and 23, are also secured to the band 11. The bottom surface of the hooks at 20', for instance, is preferably at or above the top edge of the band 11 so that the hose can take no harm from rubbing or striking the lugs 13, 14.

It will be seen that flexible hose 24 extending outwardly from the valve 18 may now be wrapped about the top end of the tank 10 and will be securely held in place by the hook elements 20, 21, 22 and 23 so that the hose and burner may be left attached to the tank without danger to the mechanic.

Figure 2:
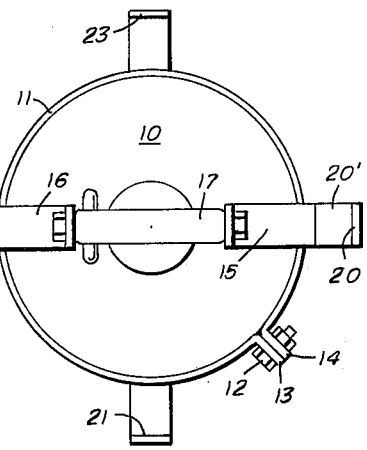
FIGURE 2 is a plan view of the carrier attached to a tank.

Since the weight of a tank of acetylene is considerable even though the tank is relatively small, it is necessary to provide a handle which will not cut into the hand of anyone carrying the tank. FIGURE 2 shows a fragmentary section of a handle 17 and the end of bail element 15, and shows the construction of a handle and shows the means by which the handle may conveniently be secured to the bail elements. The handle per se is formed of a piece of pipe or tubing 25 into each end of which a nut 26 is inserted by heavy pressure so that the nut 26 will be securely held in the pipe 25. The ends of pipe 25 may be swaged inwardly over nut 26 so that upon tightening of the bolt 27 that extends through bail element 15, cannot displace the nut 26 from the pipe 25. Each end of the handle 17, of course, is the same so that the securement of the bail 16 to the handle 17 is not shown.

Figure 4:
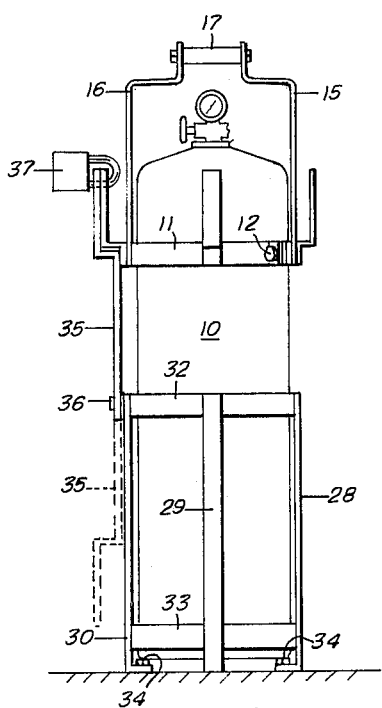
FIGURE 4 is an elevation showing a tank with the carrier applied thereto positioned in a support therefor.

Referring to FIGURE 4, a support or stand is shown that comprises at least two and preferably four uprights 28, 29, 30 and 31, upright 31 being of course invisible in FIGURE 4. A solid band 32 is secured to the top of the uprights and a solid band 33 is secured to the uprights at a distanve below the band 32. The lower end of the uprights are turned inwardly and are bolted to the floor or the deck of a vehicle by bolts 34.

It will be seen, therefore, that when a tank 10 has been positioned to this support the bolts 34 cannot be removed. This contributes to making the device an anti-theft device.

Link 35 is shown pivotally connected to the upper end of the support by a rivet 36, the length of the link 35 being such that when turned into upwardly extending position as seen in the full lines in FIGURE 4, the upper end of the link 35 lies adjacent to the upper end of hook element 22. By providing a suitable aperture in the hook element 22 and also in the end of link 35, a padlock 37 may be applied to hold the tank 10 securely in a theft-proof condition in the support. When the link element 35 is in its downwardly extending position, it is of course out of the way and the tank 10 may be inserted into and removed from the support easily and freely.

Figure 5:
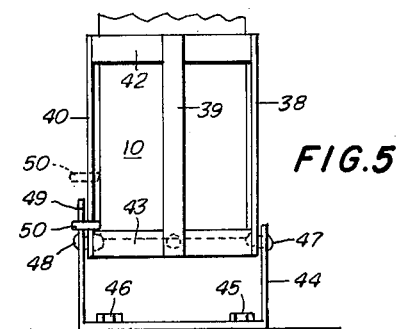
FIGURE 5 is an elevation of a slightly different form of support.
Figure 6:
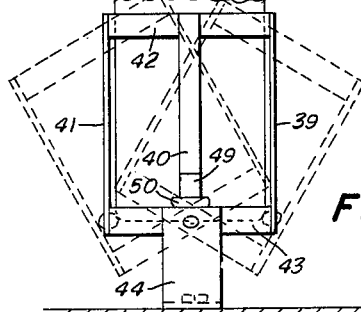
FIGURE 6 is an elevation at right angles to the elevation of FIGURE 5.

The support shown in FIGURE 5 and FIGURE 6 is provided to facilitate loading a tank 10 into the support mounted in a vehicle body, without requiring that the tank first be placed on the vehicle. The operator then gets into the vehicle, and lifts the tank again and places it in the support. As seen in FIGURE 6, the cradle of the support of this modification may be tilted so that the mechanic, standing on the ground, may tilt the cradle towards him and, by lifting and tilting the tank, may insert the bottom of the tank into the cradle and then return the cradle to its upright position, in which it may be locked.

In this modification the cradle comprises at least two, but preferably four, vertical elements 38, 39, 40 and 41 secured together at their top by a band 42 that slidingly but snugly engages the tank 10. The lower band 43 lies between the upturned ends of a U-shaped element 44 that is bolted by bolts 45 and 46 to the bed of a vehicle. Rivets 47 and 48 pivotally mount the ring 43, the uprights 38, 39, 40 and 41 and the upper ring 42 on the U-shaped element 44. The heads of rivets 47 and 48 extend inwardly within the ring 41 sufficiently to support the tank 10 therein. From one arm of the U-shaped element 44 there is an extension 49 that extends upwardly so as to lie parallel to the vertical element 38 when in upright position. This extension 49 is of substantially the same width as the upright 38. A slidable link or keeper 50 is placed about upright 38 so that when slid to the bottom of the vertical element 38 when in vertical position it also embraces the extension 49 to hold the frame of the support in vertical position and when again moved upwardly clear the extension 49 to permit tilting of the cradle. The frame or cradle of the support may be tilted as required as is shown in dotted lines in FIGURE 6.

A locking link similar to link element 35 may be provided in the support modification of FIGURES 5 and 6.

Having thus disclosed the subject matter of my invention, I therefore claim:

1. A combined hose rack and carrier for a tank of highly compressed gas comprising a band adapted to be clamped about the tank near its upper end, a pair of bail elements extending upwardly from said band to a point beyond the top of the tank, a handle element secured to said bail elements and at least two hose supports extending vertically outwardly from said band, and thence upwardly to provide a space between said supports and said tank above said band to receive a hose to be used with said tank.

2. An attachment for a tank of highly compressed gas having a reducing valve and hose connection thereon, said attachment comprising a split band, clamping means to tighten said split band about the upper end of a tank, a rigid bail handle extending upwardly from said split band a distance sufficient to clear said reducing valve and hose connection to act as a protector for said reducing valve and hose connection, and a plurality of hook-like elements extending upwardly from said band and spaced from said tank when said attachment is mounted on a tank to retain a hose wound about said tank.

3. An anti-theft, supporting, guard and carrying means for an acetylene tank comprising a support of a size to snugly receive the lower portion of an acetylene tank secured to a truck bed, or the like, a combined valve guard and carrying handle adapted to be secured to the top of a tank and a link pivoted on said support, means on said valve guard and on said link to receive a padlock whereby said valve guard may be locked to said support to retain said tank in said support.

4. The device of claim 3 in which the means on said valve guard to receive the padlock is a hook element positioned to receive and retain a hose wound about the top of the tank.

5. The device of claim 1 and further in combination therewith, a support for a portable acetylene tank comprising a U-shaped element having upwardly extending arms the bottom of said U being secured to a floor or the like, a pivot on each upwardly extending arm, a cradle positioned on said pivots between the arms of the U, said cradle being of an internal diameter to snugly and slidably receive the bottom of an acetylene tank, said cradle including a bar extending lengthwise of said cradle from one of said pivots, a prong on one arm of said U-shaped element extending upwardly above the pivot adjacent said bar, and a sliding link mounted on said bar movable, when said bar and said prong are aligned, to embrace said prong to hold said cradle upright.

References Cited by the Examiner

UNITED STATES PATENTS

| | | | |
|---|---|---|---|
| 1,094,669 | 4/1914 | McCord | 248—142 |
| 1,607,053 | 11/1926 | Buchanan | 294—31.2 |
| 2,635,939 | 4/1953 | Obenchain | 248—203 |
| 2,757,958 | 8/1956 | Bussey et al. | 248—79 |
| 3,173,704 | 3/1965 | Boudreau | 280—36 |

GERALD M. FORLENZA, *Primary Examiner.*